Jan. 2, 1962  A. N. HALE  3,015,290
STITCH LENGTH CONTROL FOR SEWING MACHINES
Filed May 28, 1958  10 Sheets-Sheet 1

Jan. 2, 1962 A. N. HALE 3,015,290
STITCH LENGTH CONTROL FOR SEWING MACHINES
Filed May 28, 1958 10 Sheets-Sheet 5

FIG. 10

Jan. 2, 1962   A. N. HALE   3,015,290
STITCH LENGTH CONTROL FOR SEWING MACHINES
Filed May 28, 1958   10 Sheets-Sheet 9

Jan. 2, 1962             A. N. HALE            3,015,290

STITCH LENGTH CONTROL FOR SEWING MACHINES

Filed May 28, 1958            10 Sheets-Sheet 10

United States Patent Office 3,015,290
Patented Jan. 2, 1962

3,015,290
STITCH LENGTH CONTROL FOR SEWING
MACHINES
Arthur N. Hale, Park Ridge, Ill., assignor to Union Special Machine Company, Chicago, Ill., a corporation of Illinois
Filed May 28, 1958, Ser. No. 738,333
6 Claims. (Cl. 112—210)

This invention relates to sewing machines and more particularly to means for quickly changing the stitch length, or the extent of feed imparted to the work on each stitch forming cycle. It is particularly useful in connection with overedge sewing machines for the purpose of shortening the stitch length at the two ends of a seam and thus effectively tacking the ends of the seam.

Arrangements have been developed heretofore for accomplishing the general purposes of the invention but these have operated upon the principle of changing the feed stroke imparted to a four-motion feed dog. While these have been reasonably satisfactory, they have involved complicated mechanisms between the eccentrics, or the like, which operate the feed dogs and the carriers for the feed dogs.

In accordance with the present invention, the stitch length, or effective feed stroke of one or more four-motion feed dogs, is changed from one predetermined value to another without changing the extent of movement of the feed dogs. This is accomplished by taking advantage of the elliptical contour of the path of movement of the work engaging teeth of the feed dogs. The throat plate which supports the work and through which the feed dogs move, as they are given their elliptical motion, is made shiftable in a vertical direction to vary the elevation of the work supporting surface of the plate. When it is in the lower of two predetermined positions, it permits the feed dogs to be effective during a greater portion of their movement in the work feeding direction than when it is lifted into the higher of the two predetermined positions. The lower of the two positions may, if desired, be fixed and determined by a permanently set shoulder or stop, or it may be determined by an adjustable stop. Preferably, the upper position is determined by an adjustable shoulder or stop against which a portion of the throat plate lifting mechanism is carried in response press or treadle or the like, without the necessity of any effort by the operator to limit the extent of movement of the operating member.

While the mechanism for imparting four-motion movements to the feed dogs may be of any suitable, known character, it is preferably such as to give to the teeth of the feed dogs an elliptical path of movement which has a suitable ratio between the lengths of its major and minor axes. The path should be such as to make possible a relatively great variation in the active portion of the path of the teeth as the throat plate is lifted to different extents, but it should not be so flat as to require fine tolerances or introduce errors due to wear of the parts in the selection of different feed strokes as the throat plate is lifted.

In achieving the foregoing purposes, the invention encompasses the provision of simple, durable and reliable means for bringing about the desired movement of the throat plate between the two positions mentioned. It enables the length of the stitches being formed to be readily and quickly changed whenever desired. Thus, in forming an overedge seam, a suitable number of relatively short stitches may first be made to tack the beginning of the seam. Such stitches may, for example, be 20 or more per inch and this is accomplished by rocking a lever under control of a knee press or the like to lift the throat plate a predetermined distance. When the beginning of the seam is suitably tacked, the knee press or other control member is released, while the machine is in operation, and the throat plate is restored quickly by spring action to its normal or lowered position in which the feed dogs are enabled to increase their feed action to provide, say, 10 stitches per inch for the major portion of the seam. As the opposite end of the seam is approached, the operator may again operate the control member to lift the throat plate into its upper, predetermined position and thus reduce the feed action of the feed dogs to produce shortened stitches to tack the trailing end of the seam.

The construction contemplated by the invention, moreover, is such that it may be readily applied to existing overedge machines by the addition of certain parts and with little or no change in the construction of the main frame of the machine or in its various instrumentalities or the operating devices therefor. Existing machines may, therefore, be readily modified to adapt them to produce stitches of different length in different portions of a seam in the course of forming the latter.

Other objects, features and advantages of the invention will appear from the detailed description of an illustrative embodiment of the same which will now be given in conjunction with the accompanying drawings, in which:

FIG. 9 is a partially assembled and partially exploded perspective view of the throat plate supporting and lifting mechanism as seen from the opposite direction from that in which FIG. 8 is taken;

FIG. 16 is a diagrammatic view, on a greatly enlarged scale, showing the path of a tooth on one of the feed dogs in relation to the throat plate; and FIG. 17 is a view similar to FIG. 16 but shows the path of a feed dog tooth in relation to the throat plate when the latter is lifted.

The sewing machine to which the invention has been shown applied in the accompanying drawings is substantially of the character shown in the patent to Wallenberg et al. No. 2,704,042, granted March 15, 1955. This machine is adapted to provide either a two-thread or three-thread overedge type of stitch. It is equipped with mechanism for trimming the edge of the work in advance of the point of stitch formation, work feeding means for advancing the work, and means for providing an overedge stitch of one or another of the types indicated. Reference may be had to said Wallenberg et al. application for a fuller understanding of the construction and operation of the various mechanisms and means mentioned. Only a brief description of the indicated parts will be given herein.

Figure 1:
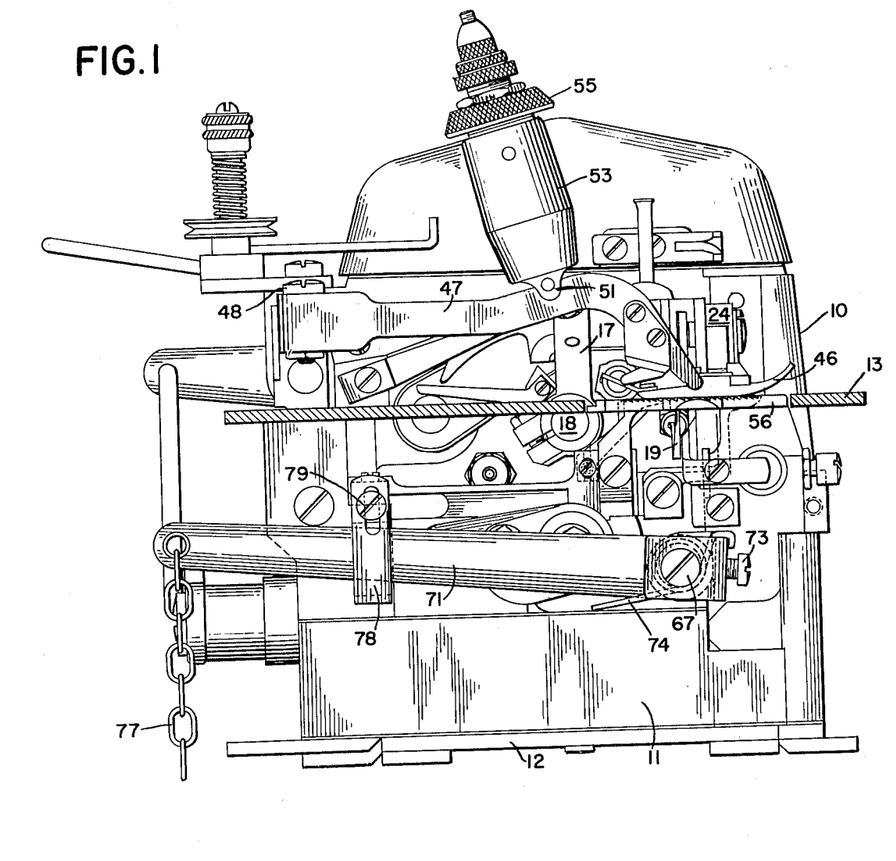
FIG. 1 is an end elevational view of a machine embodying the invention, with the cloth plate shown in section.
Figure 2:
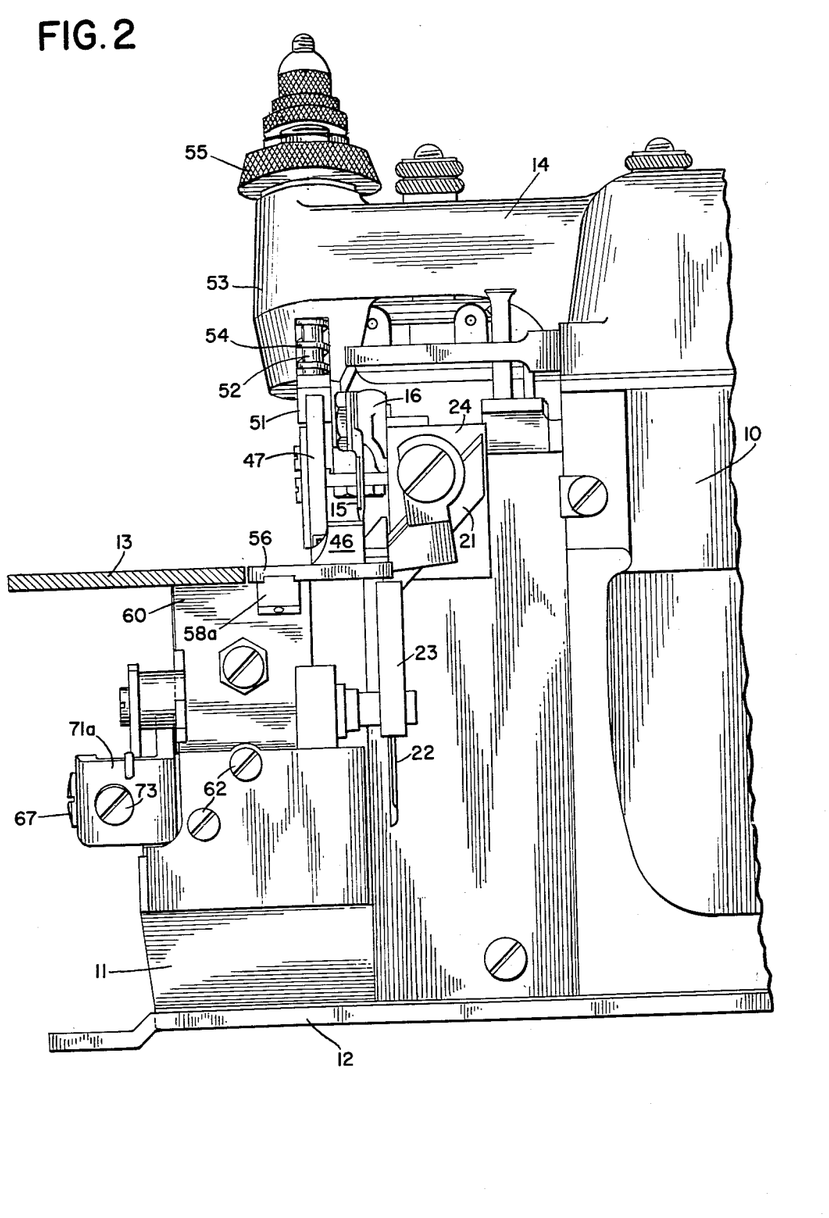
FIG. 2 is a front elevational view of the lefthand portion of the machine, with the cloth plate shown in section.
Figure 3:
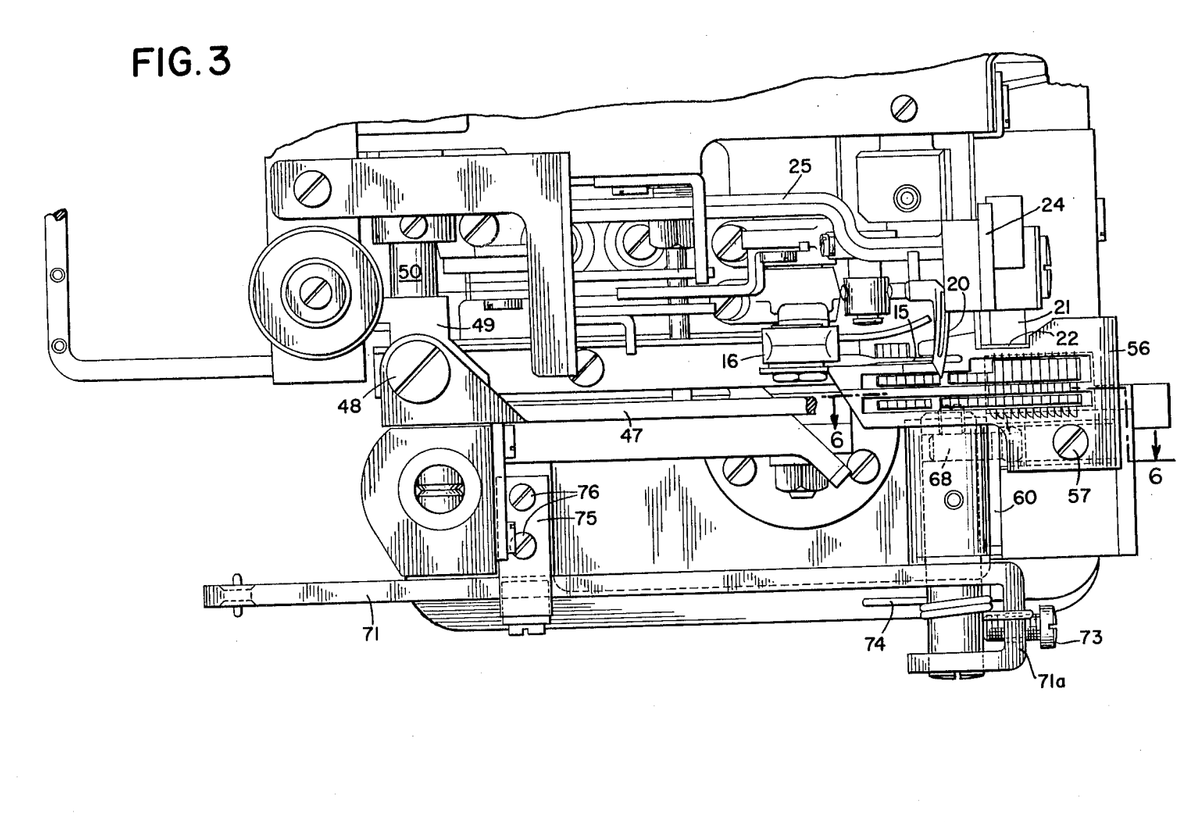
FIG. 3 is a plan view of a portion of the base of the machine with the cloth plate removed.
Figure 4:
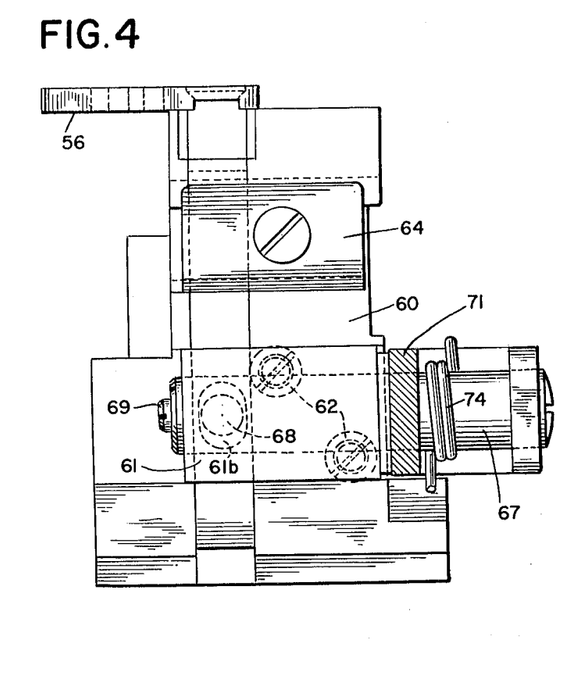
FIG. 4 is a rear view of a throat plate supporting and lifting unit embodied in the machine, a portion of a throat plate operating lever being shown in section.
Figure 5:
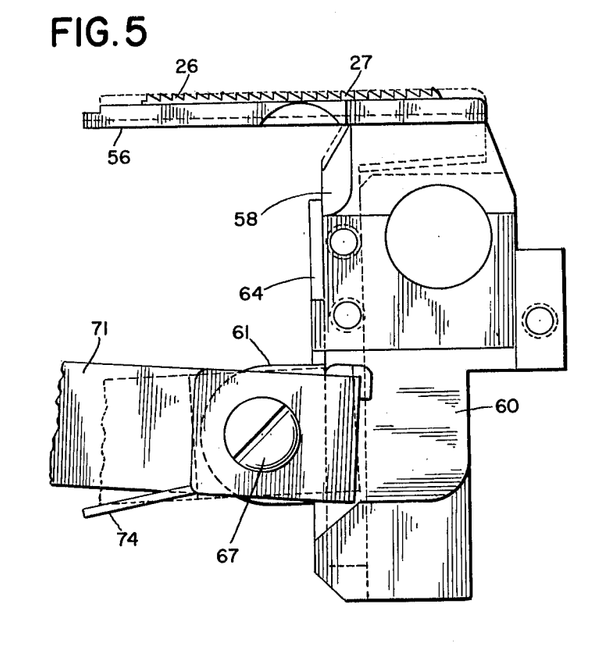
FIG. 5 is a view of the parts shown in FIG. 4 as seen from the right of the latter, the teeth of the feed dogs being shown in an elevated position.
Figure 6:
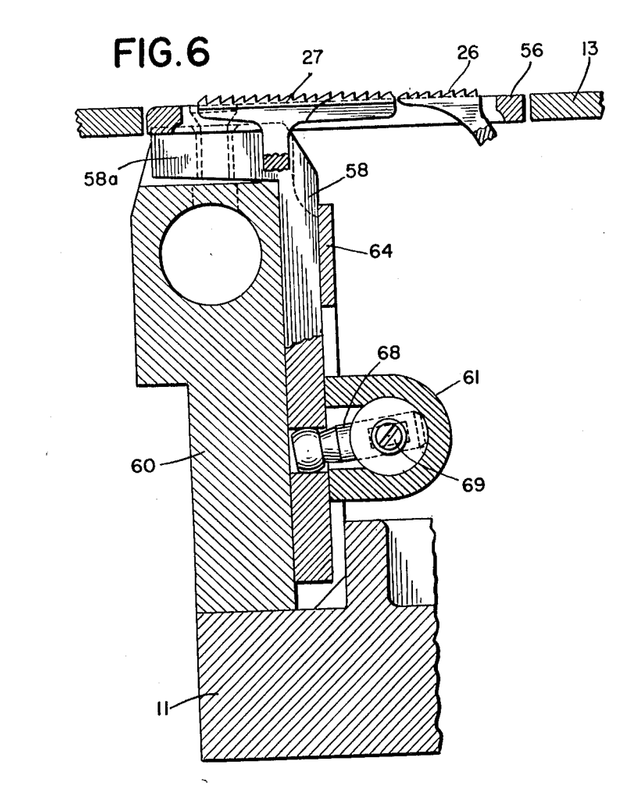
FIG. 6 is a vertical sectional view through the throat plate supporting and lifting mechanism and adjacent portions of the cloth plate and feed dogs, taken along the line 6—6 of FIG. 3.
Figure 7:
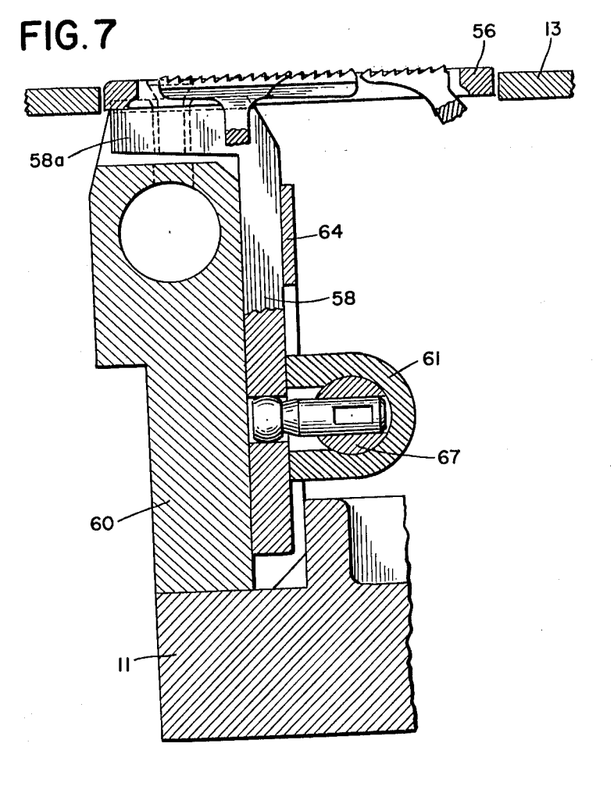
FIG. 7 is a view similar to FIG. 6 but showing the throat plate and its lifting mechanism in a different position.
Figure 8:
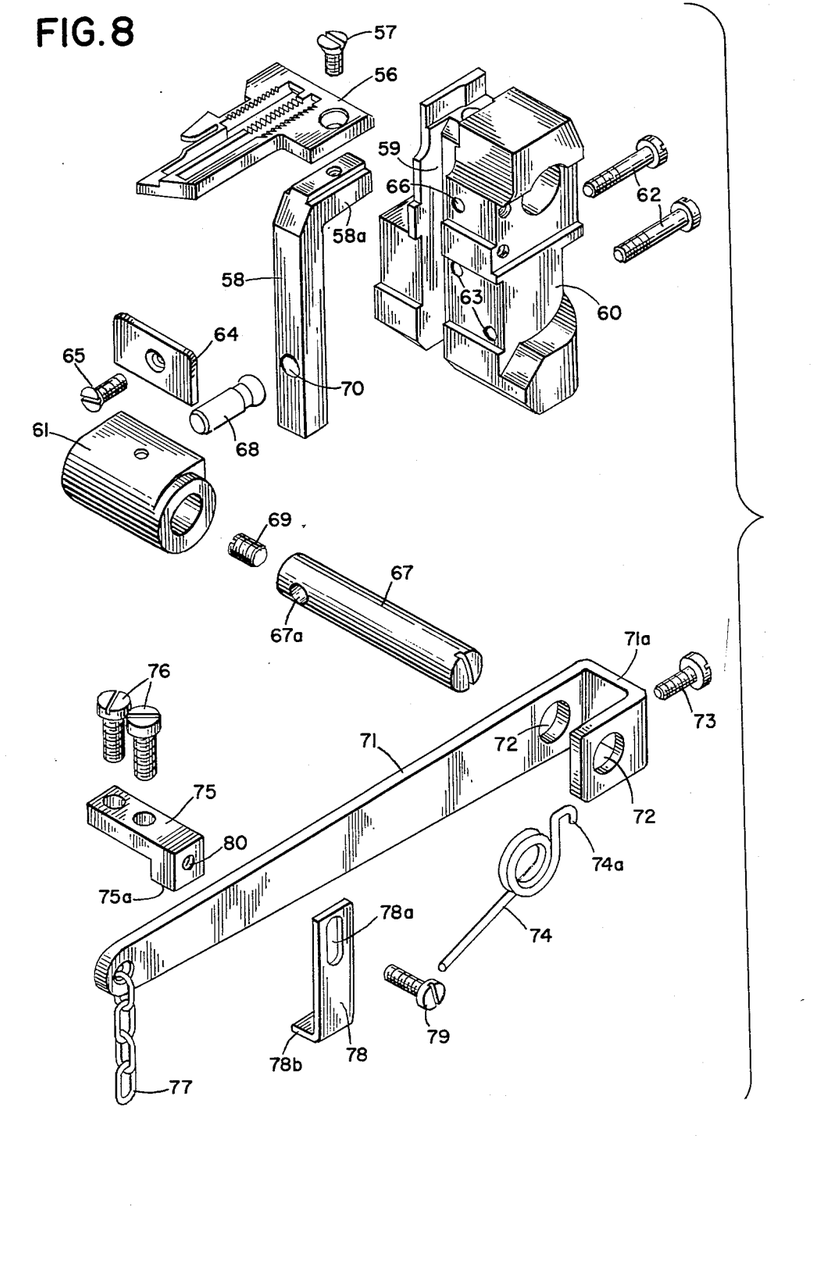
FIG. 8 is an exploded perspective view of the throat plate and its supporting and lifting mechanism.

Referring now to FIGS. 1, 2 and 3 of the drawings, the machine comprises a frame having an enclosed housing portion 10 adapted to provide a lubricant-tight enclosure for the major portion of the driving connections of the machine. From the enclosed housing portion 10 there extends a work-supporting base portion 11. A bottom closure 12 extends beneath the portions 10 and 11 of the frame and provides means for supporting the machine from a suitable sewing table or stand. At the top of the work-supporting portion of the base there is provided a cloth plate 13. An arm 14 extending from the enclosed housing portion 10 of the frame extends over the work-supporting base portion some distance above the cloth plate 13.

The stitch forming instrumentalities of the machine comprise a curved needle 15, clamped in a head 16 at the upper end of an arm 17 secured to a rock shaft 18. The latter, it will be understood, is arranged to be rocked upon each revolution of the main drive shaft of the machine in the manner disclosed in said Wallenberg et al. patent. Cooperating with the needle is an under looper 19 and an overedge looper 20 arranged to be operated by connections from the main drive shaft of the machine of the character disclosed in said Wallenberg et al. patent. As indicated therein, the overedge looper 20 may be replaced by a spreader in the event that a two-thread overedge stitch is desired. If both loopers 19 and 20 are of the thread-carrying type, a three-thread overedge stitch will be produced.

In advance of the zone in which the stitch forming devices serve to produce the overedge stitch in the manner explained, there is provided means for trimming the edge of the work. For this purpose there is provided a movable blade 21 and a stationary blade 22. The latter is mounted in a head or carrier 23 arranged beneath the cloth plate and either spring-urged or properly adjusted to retain the blade 22 in proper cutting relation to the movable blade. The movable blade is adjustably secured in a head 24 at the forward end of a lever or rock arm 25. This is adapted to be rocked upon each revolution of the main drive shaft of the machine through connections of the character more fully disclosed in the patent to Peterson et al. No. 2,636,462, granted April 28, 1953.

Figure 10:
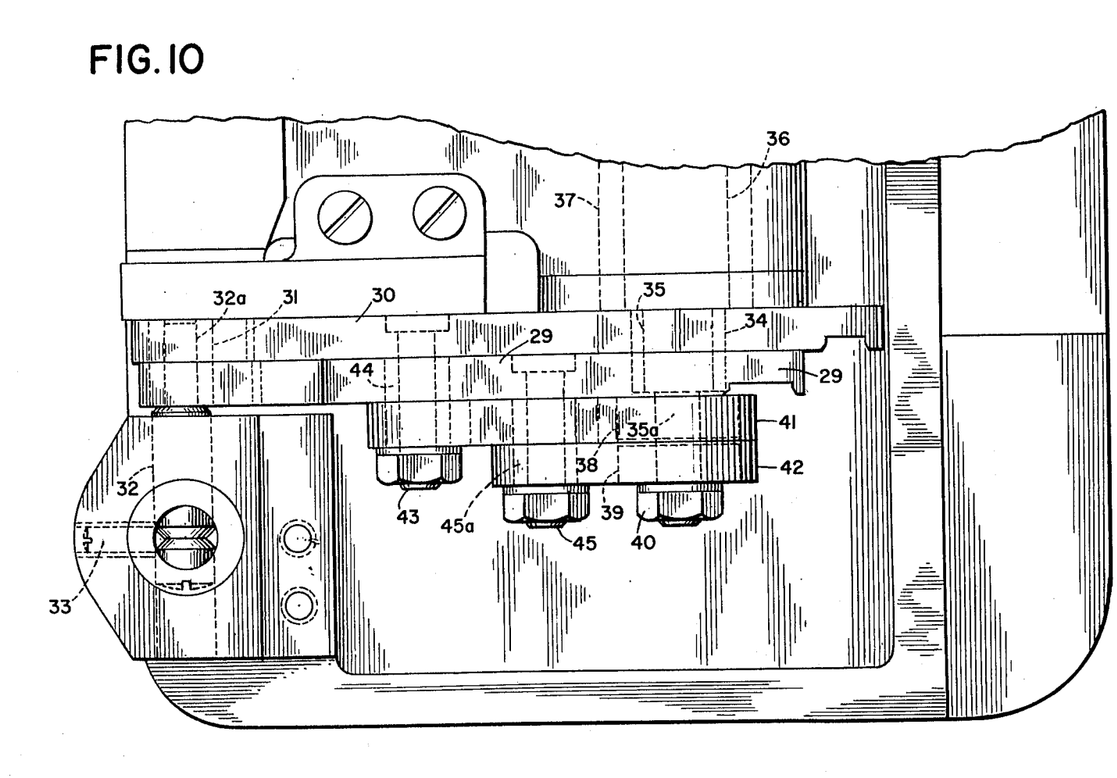
FIG. 10 is a plan view of a portion of the base of the machine showing the feed dog carrying bars and the operating mechanism therefor.
Figures 11, 12, 13:
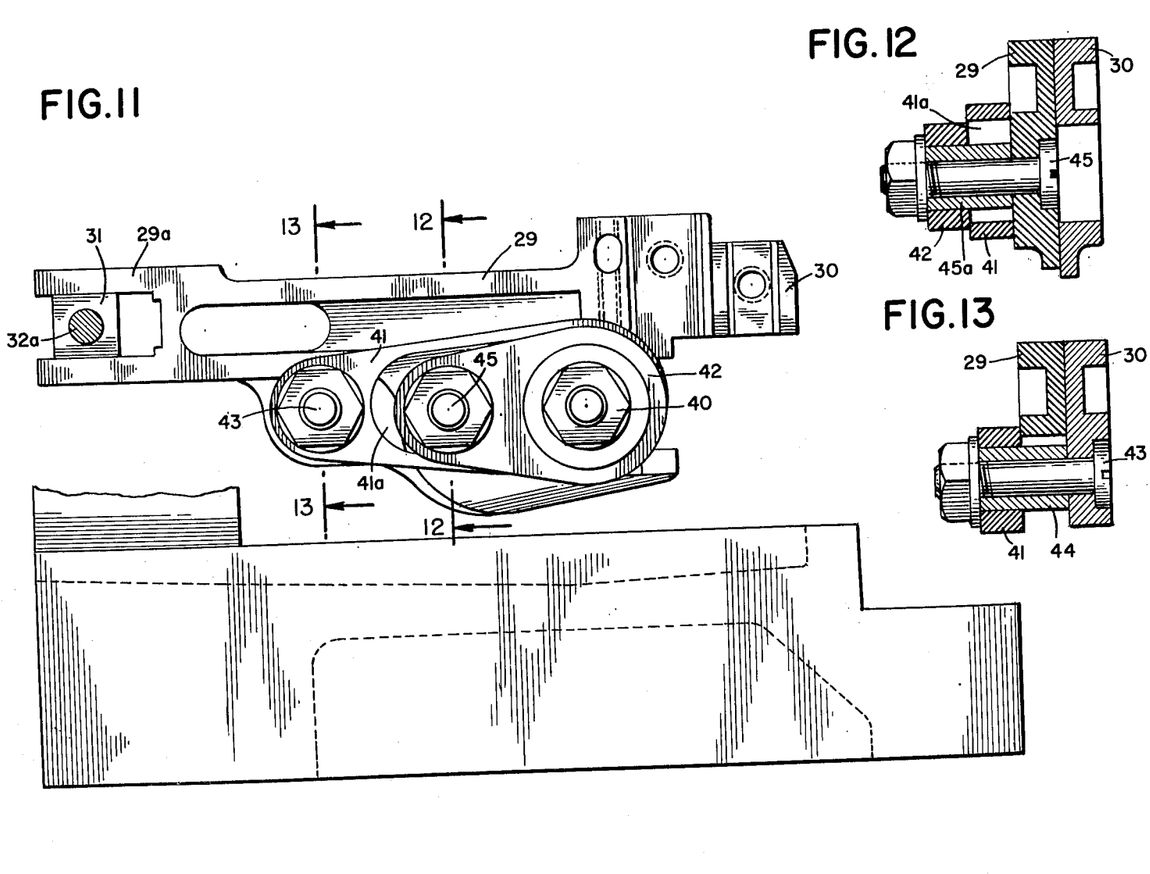
FIG. 11 is a side elevational view of the feed bars and the operating mechanism therefor in relation to a portion of the base of the machine.
FIG. 12 is a vertical sectional view taken along the line 12—12 of FIG. 11.
FIG. 13 is a vertical sectional view taken along the line 13—13 of FIG. 11.
Figures 14, 15:
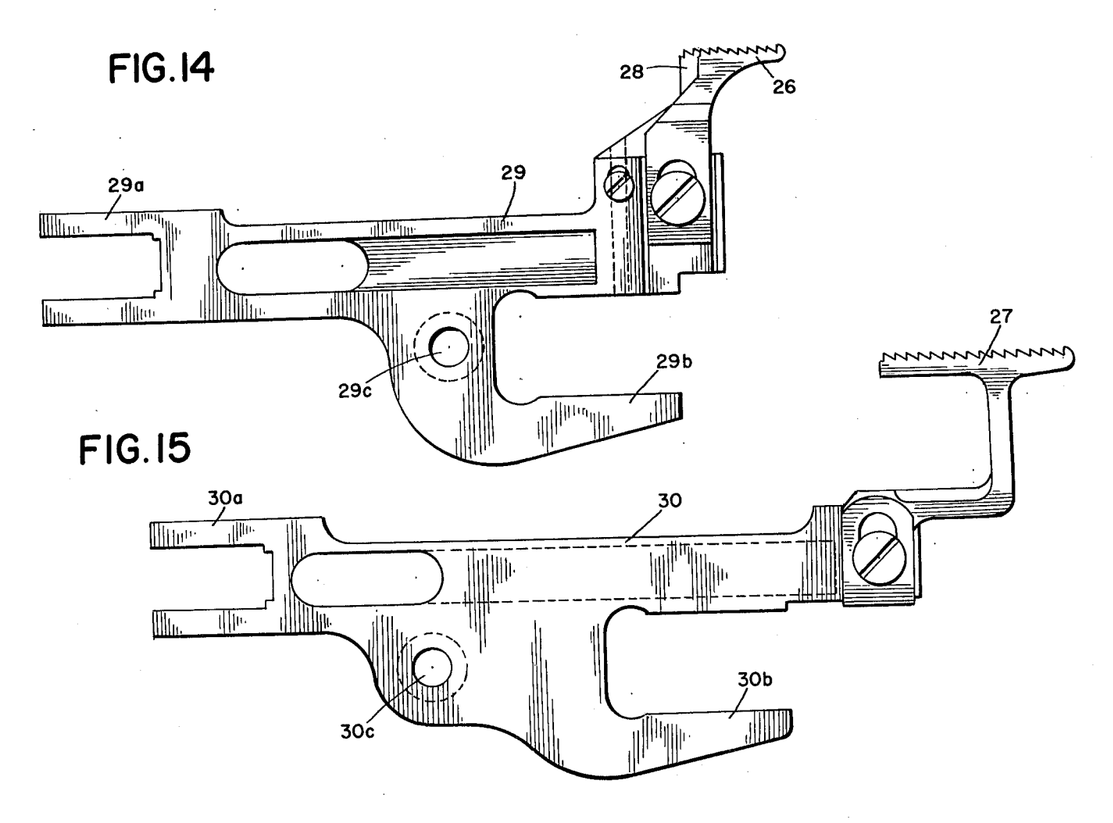
FIG. 14 is a side elevational view of the main feed bar together with the main feed dog and chain feed dog carried thereby.
FIG. 15 is a side elevational view of the auxiliary or differential feed bar together with the differential feed dog.

For advancing the work to and through the region of stitch formation, there is provided a main feed dog 26 and an auxiliary or differential feed dog 27 (see particularly FIGS. 14 and 15). In addition, there is provided a chain feed dog 28 arranged to grip and advance the free thread chain which may be produced between successive work pieces. Main feed dog 26 and chain feed dog 28 are mounted upon a feed bar 29, while the differential feed dog 27 is mounted on a feed bar 30. Preferably, the several feed dogs are mounted on their respective feed bars in such a way as to enable a certain amount of vertical adjustment of the feed dogs in relation to their bars. Feed bar 29 has a forked rearward extension 29a and feed bar 30 has a similar forked rearward extension 30a, both of these being arranged to cooperate with a block 31 (FIG. 11) mounted for free turning upon a reduced eccentric portion 32a of a pin 32 (FIG. 10) rotatably adjustable in the base of the frame of the machine. The arrangement is such that the pin 32 may be turned to vary the elevation of the eccentric portion 32a thereof and may then be locked in set position by a set screw 33. It will be understood that in the operation of the machine the feed bars 29 and 30 will slide in a longitudinal direction upon the block 31 and will pivot to a certain extent about the axis of the portion 32a of pin 32. By suitable adjustment of the latter, the location of the axis about which the feed bars will be pivoted may be varied slightly to insure the desired path of movement of the teeth of the several feed dogs.

Adjacent its forward end the feed bar 29 is provided with an extension 29b which in effect forms a fork with the forwardly extending portion of the bar. Similarly, feed bar 30 is provided with a forwardly extending portion 30b. The forked formations thus provided have a sliding fit in relation to a square block 34 (FIG. 10) mounted upon an eccentric portion 35 of a main drive shaft 36 of the machine which is suitably journaled in a bearing sleeve 37. The arrangement is such that as the shaft rotates it will impart rising and falling movements to the forward ends of the feed bars and hence to the several feed dogs. A reduced extension 35a of the drive shaft has keyed thereto a pair of eccentrics 38 and 39 which may be readily replaced whenever desired to vary the normal feed stroke of the machine. Co-operating with eccentric 38 is a pitman 41 (FIGS. 10 to 13) and cooperating with the eccentric 39 is a pitman 42. The rearward end of pitman 41 is connected by a bolt 43 with the auxiliary feed bar 30. This bolt is received by an opening 30c (FIG. 15) through the feed bar which is in rear of the downward and forward extension of the feed bar 29 and therefore does not interfere with the later. A spacing collar 44 surrounding the bolt 43 serves to retain the feed bar 30 and the pitman 41 in properly spaced relation. It will be apparent that, through the connections described, longitudinal movements will be imparted to the feed bar 30 by the eccentric 38. Similarly, the pitman 42 is connected by means of a bolt 45 with the feed bar 29 so that longitudinal movements are imparted to the latter by the eccentric 39. Bolt 45 cooperates with opening 29c in the feed bar. Pitman 41 is provided with a clearance opening 41a (FIG 11) through which the bolt 45 and a spacing collar 45a pass so that there is no interference between said bolt and collar and said pitman in the operation of the machine. The eccentrics 38 and 39 may be of any suitable throw to provide for any desired feed stroke, and relationship between the feed strokes, of the two feed bars 29 and 30.

Cooperating with the feed dogs and arranged to urge the work yieldingly against the latter as they rise above the work-supporting surface of the machine is a presser foot 46 pivotally mounted upon the forward end of a presser arm 47 (FIG. 1). The latter is mounted for movement in a horizontal direction about the axis of a bolt 48 to enable the presser foot to be swung outwardly when the machine is at rest, to provide access to various parts. The bolt 48 extends through a portion of a member 49 secured to a rock shaft 50 (FIG. 3) This permits rocking movements of the arm 47 in a vertical plane during the operation of the machine. A yoke 51 at the lower end of a rod 52 mounted for longitudinal movement within a head 53 at the end of the arm 14 of the frame is arranged to straddle the presser arm 47. A spring 54 within the head 53 normally urges the rod 52 and yoke 51 downwardly to urge the presser foot yieldingly against the work-supporting surface of the machine or against the feed dogs when the latter are lifted in the course of operation of the machine. As explained in the above mentioned Wallenberg et al. patent, provisions are made for varying the force of the spring 54 and also for releasing the compressive force of said spring when it is desired to disengage the yoke 51 from arm 47 to enable lateral shifting of the latter about the pivot 48. A knurled head 55 connected with a sleeve mounted in the head 53 brings about the indicated release of the force of the spring 54 in the manner disclosed in said Wallenberg et al. patent.

Within the area of the cloth plate 13, in the region of stitch formation and movement of the feed dogs, there is provided a throat plate 56 (FIGS. 1 to 8). The latter is arranged for vertical movement to vary its elevation in relation to the feed dogs. It is provided with suitable openings and cut-outs through which the feed dogs, the needle and other operating devices may pass. Throat plate 56 is secured by means of a screw 57 to a horizontally extending arm 58a of an L-shaped slide 58. The vertical arm of this slide is arranged for vertical movement within a channel 59 formed in a block 60 which is secured in any suitable way, as by screws, to a portion of the base 11 of the machine frame. Slide 58 is retained with in the channel 59 by means of a block 61 secured to the block 60 by screws 62 which pass through openings 63 in block 60 and have threaded engagement with openings 61a (FIG. 9) in the block 61. The slide 58 is also retained within the channel 59 by means of a plate 64 secured by a screw 65 to the block 60. Screw 65 cooperates with the threaded opening 66 (FIG. 8) in the block 60.

Within the block 61 there is journaled for rocking movement a shaft 67 having a transverse opening 67a which receives the shank of a ball pin 68. The latter is retained in the opening 67a by means of a set screw 69. Pin 68 projects outwardly through a vertically elongated opening 61b (FIG. 9) in the face of the block 61 which cooperates with the block 60. The ball end of pin 68 cooperates with an opening 70 in the slide 58. It will be seen that, through the connections described, rocking movements imparted to the shaft 67 will cause lifting and lowering movements of the slide 58 and hence the throat plate 56. For rocking the shaft 67 there is secured thereto an arm 71 having a laterally and rearwardly bent portion 71a. Aligned openings 72 are provided in the arm to receive the shaft 67, and the arm is secured to the saft by means of a set screw 73. A spring 74 has a hooked end 74a arranged to be hooked over the laterally extending portion 71a of the arm 71. The opposite end of the spring 74 engages a horizontal surface on the base portion of the frame of the machine. It will thus be seen that the spring 74 tends to rock the arm 71 in a clockwise direction (FIG. 1). Thus normally the slide 58 will be urged downwardly by the pin 68 into its lower position. This may be determined by the cooperation of the under surface of the throat plate with the top surface of the block 60 or by the engagement of the arm 71 with a surface 75a on a block 75 secured to the base portion of the frame by screws 76. If desired, the lower limit of the slide 58 may be made adjustably by providing an adjustable screw or other element (not shown) for limiting the rocking movement of the arm 71 under the action of the spring 74. This may, for example, be provided in the top of the block 60.

When it is desired to lift the throat plate to shorten the effective feed stroke of the machine in the manner explained, the arm 71 may be rocked downwardly or in a counter-clockwise direction by a pull on a chain 77 which may suitably be connected at its lower end to a treadle or knee press. In order to limit the downward movement of the arm 71, and thus effect a predetermined lifting of the throat plate, there is provided an adjustable stop 78 arranged to be secured by a screw 79 to the block 75 which has a screw-threaded opening 80 arranged to receive the screw 79. Stop 78 has a vertically elongated opening 78a to enable the vertical position of this stop to be varied as desired. A laterally extending finger 78b at the lower end of the stop 78 is arranged to cooperate with the undersurface of the arm 71 as the latter is rocked downwardly in the manner explained.

Figures 9, 16, 17:
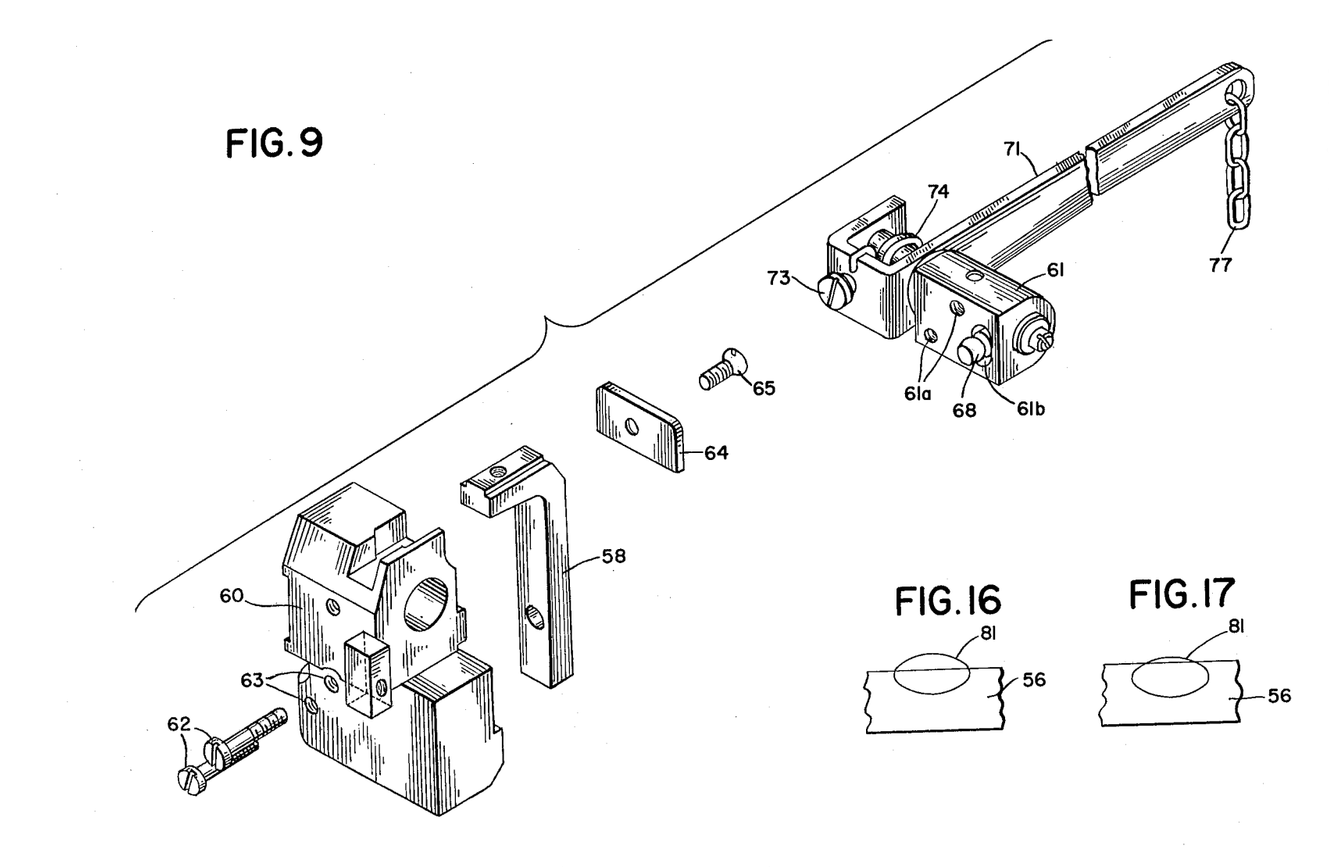

It will be apparent that through the construction described, the throat plate 56 may normally be urged into a bottom position by the action of spring 74 in which a relatively large portion of the horizontal movement of the feed dogs is effective in advancing the work. When it is desired to reduce the effective feed stroke, the throat plate is lifted in the manner explained so that a smaller portion of the horizontal movement of the feed dogs is in a zone above the top of the throat plate and is effective in advancing the work. FIG. 16 indicates schematically the lower position of the throat plate 56 in relation to an elliptical path 81 followed by the outermost portion of a tooth on one of the feed dogs as the latter is given its feed and return and lifting and lowering movements. FIG. 17 shows schematically an elevated position of the throat plate 56 in relation to the tooth path 81 mentioned above. It is desirable to so construct the mechanisms which impart the feed and return movements to the feed bars and the lifting and lowering movements thereto that the elliptical path 81 will not have its upper portion too flat. This portion of the path of each feed dog tooth should climb and descend moderately steeply, but not too steeply, so that the lifting of the throat plate to varying extents will have a substantial effect in changing the feed stroke during a cycle of operation of the machine, without, however, requiring extreme accuracy in the elevation of the throat plate to provide a particular reduction in stitch length. Desirably, the longitudinal movements of the feed bars may be about double the distance through which the feed dogs are lifted and lowered. A machine constructed to provide normally a stitch length of, say, 10 stitches to an inch may readily be adapted to provide 15 or 20, or any other desired number of stitches to an inch when the throat plate is lifted a selected extent.

In the preferred construction shown, the means for supporting the lower or fixed cutter blade of the trimming mechanism is carried by the block 60. Suitable devices are provided on said block for maintaining said blade in proper cutting relation to the movable trimmer blade.

While a preferred embodiment of the invention has been described in detail, it will be understood that various changes may be made in the construction and arrangement of the several parts without departing from the scope of the invention as defined by the appended claims.

What is claimed is:

1. In a sewing machine having a frame provided with a work-supporting surface, a four motion feed dog having a work engaging top portion, means for imparting movement to said feed dog to carry said work engaging portion thereof along a substantially elliptical path partially above and partially beneath said surface and a presser foot spring urged toward said surface, the combination which comprises a throat plate arranged to provide a portion of said surface through which said feed dog is moved perpendicularly thereto and longitudinally thereof in the direction of feed, vertically movable means on which said throat plate is mounted for lifting movement into different positions in relation to said surface, and the path of the work engaging portion of said feed dog, a member operable during the operation of the machine at the will of the operator connected with said vertically movable means for lifting said throat plate into said different positions to vary the extent of said path along which the said work engaging portion of the feed dog is above the work supporting surface of the throat plate, means for normally urging said throat plate into a predetermined vertical position in relation to the path of said feed dog, and adjustable means providing a positive stop for predetermining the extent of movement of said throat plate by said member and thereby verying the effective feed stroke of said feed dog to a pre-selected amount.

2. In a sewing machine of the character set forth in claim 1, said vertically movable means comprising a vertically movable slide to which said throat plate is secured, a rock shaft, a connection from said rock shaft to said slide for lifting and lowering the same, said member operable at will being connected with said shaft for rocking the same.

3. In a sewing machine of the character set forth in claim 2, the connection between said rock shaft and said slide comprising a ball pin projecting from one of the same cooperating snugly with an opening in the other thereof.

4. In a sewing machine of the character set forth in claim 3, said ball pin projecting radially from said rock shaft and said opening being provided in said slide.

5. In a sewing machine of the character set forth in claim 1, said feed dog having teeth for engaging the under surface of the work, said means for imparting movement to said four motion feed dog being constructed and arranged to impart movements to said top portion of said fed dog along a path which in the direction of feed is less than double the extent of lifting and lowering movements imparted to said feed dog.

6. In a sewing machine having a frame provided with a work-supporting surface, a plurality of four motion feed dogs beneath said surface, a presser foot spring urged toward said surface and arranged to cooperate with said feed dogs, means for imparting different extents of movement to said feed dogs in the direction of feed and for lifting and lowering the same to carry work engaging top portions thereof through said work-supporting surface, each of the feed dogs being thereby given a predetermined elliptical path of movement, the combination which comprises a throat plate arranged to provide a portion of said surface through which the top portions of said feed dogs are lifted and lowered and shifted in the direction of feed, a member operable at will during the operation of the machine for shifting said throat plate into different positions parallel with said surface and in different relation to the paths of said top portions of said feed dogs, means for normally urging said throat plate into a predetermined vertical position in relation to the path of said feed dogs, and adjustable means providing a positive stop for predetermining the extent of vertical movement of said throat plate by said member and thereby varying the extent to which said top portions of said feed dogs are carried above the top surface of the throat plate and thus varying the effective feed stroke of each of said feed dogs to a pre-selected amount.

References Cited in the file of this patent

UNITED STATES PATENTS

| | | |
|---|---|---|
| 478,063 | Lichtfeldt | June 28, 1892 |
| 791,384 | Viglini | May 30, 1905 |
| 1,353,534 | Hughes | Sept. 21, 1920 |
| 2,199,173 | Gruman | Apr. 30, 1940 |
| 2,426,506 | Ingwer | Aug. 26, 1947 |
| 2,704,042 | Wallenberg et al. | Mar. 15, 1955 |
| 2,829,614 | Parry | Apr. 8, 1958 |
| 2,920,593 | Johnson | Jan. 12, 1960 |

FOREIGN PATENTS

| | | |
|---|---|---|
| 676,958 | Germany | June 15, 1939 |